(12) United States Patent
Bjorni et al.

(10) Patent No.: US 10,101,142 B2
(45) Date of Patent: Oct. 16, 2018

(54) METHOD IN THE INSTALLATION OF AN ELEVATOR AND TOOL FOR USE IN THE METHOD

(71) Applicants: Osmo Bjorni, Hyvinkaa (FI); Petri Niemi, Riihimaki (FI); Tomi Kapanen, Hameenlinna (FI); Petri Pukkila, Lappila (FI)

(72) Inventors: Osmo Bjorni, Hyvinkaa (FI); Petri Niemi, Riihimaki (FI); Tomi Kapanen, Hameenlinna (FI); Petri Pukkila, Lappila (FI)

(73) Assignee: KONE CORPORATION, Helsinki (FI)

( * ) Notice: Subject to any disclaimer, the term of this patent is extended or adjusted under 35 U.S.C. 154(b) by 491 days.

(21) Appl. No.: 14/956,690

(22) Filed: Dec. 2, 2015

(65) Prior Publication Data
US 2016/0084628 A1    Mar. 24, 2016

Related U.S. Application Data

(63) Continuation of application No. PCT/FI2014/050141, filed on Feb. 26, 2014.

(30) Foreign Application Priority Data

Jun. 7, 2013 (FI) .................................. 20135631

(51) Int. Cl.
*G01B 5/14* (2006.01)
*B66B 19/00* (2006.01)
*B66B 13/30* (2006.01)

(52) U.S. Cl.
CPC ............... *G01B 5/14* (2013.01); *B66B 13/30* (2013.01); *B66B 19/00* (2013.01)

(58) Field of Classification Search
CPC .. G01B 5/14; B66B 19/00; B66B 7/00; B66B 13/30; B66B 19/002; B66B 7/02
(Continued)

(56) References Cited

U.S. PATENT DOCUMENTS 4,819,403 A * 4/1989 Penicaut ............... B66B 13/303
33/194
5,492,201 A * 2/1996 Ericson ..................... B66B 7/06
187/401
(Continued)

FOREIGN PATENT DOCUMENTS

CN    102419142 A     4/2012
JP    06156922 A  *  6/1994
(Continued)

OTHER PUBLICATIONS

Finish Search Report for Application No. 20135631 dated Feb. 24, 2014.
(Continued)

*Primary Examiner* — Christopher Fulton
(74) *Attorney, Agent, or Firm* — Harness, Dickey & Pierce, PLC

(57) ABSTRACT

The object of the invention is a method in the installation of an elevator, said elevator being provided with an elevator car traveling in a controlled manner along guide rails in an elevator hoistway, for determining the disposal location of the hoistway components to be disposed in the elevator hoistway and/or the landing doors of the elevator. The disposal location of the hoistway components and/or of the landing doors of the elevator is determined in relation to the guide rails of the elevator car by copying the disposal location at different heights in the elevator hoistway mechanically by means of a tool, in which tool the disposal locations according to plan of the hoistway components are arranged to remain fixed for essentially at least the whole
(Continued)

Figure 1:
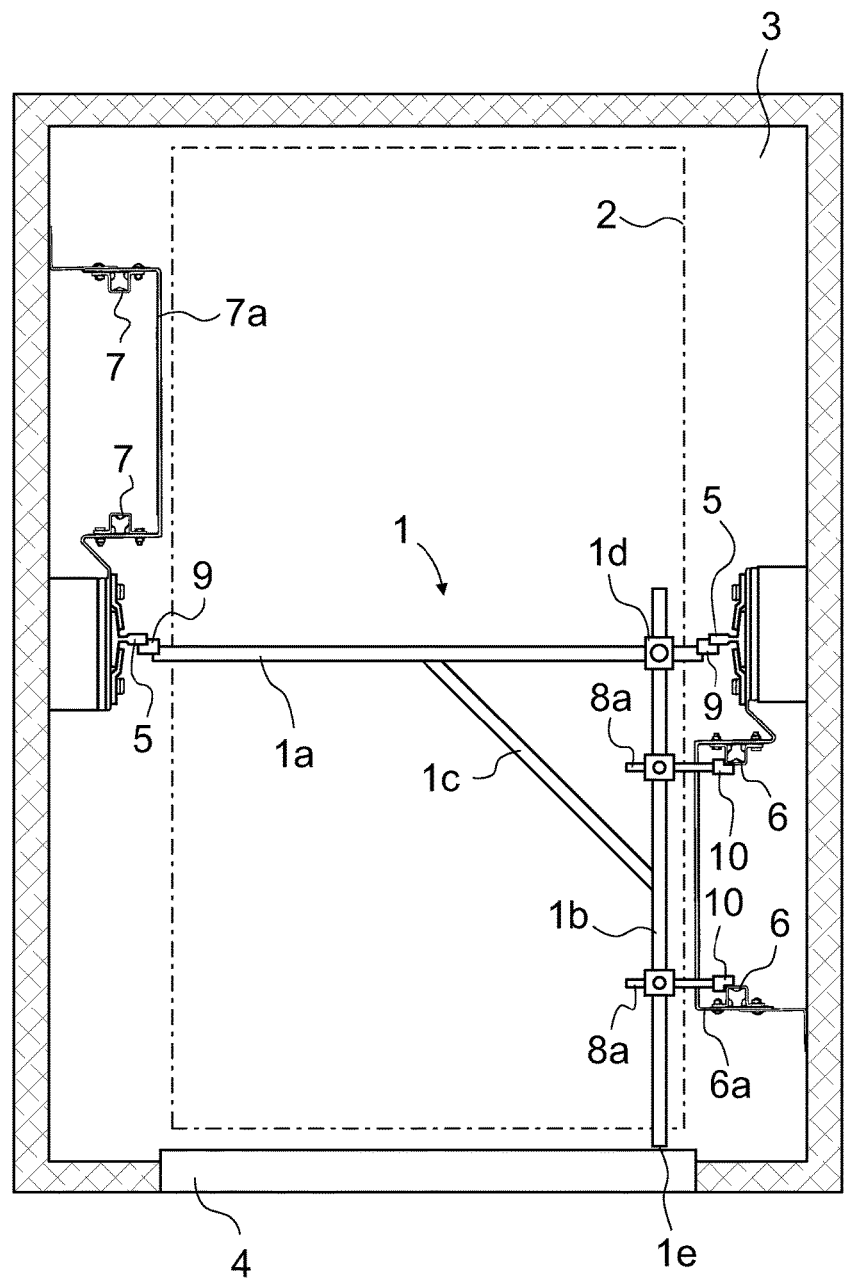

period of the aforementioned determination of the disposal locations of the hoistway components of the elevator hoistway and/or of the landing doors of the elevator. The object of the invention is also a tool to be used in the method.

20 Claims, 7 Drawing Sheets

(58) Field of Classification Search
USPC ............. 33/559, 1 BB, 407, 429, 613, 645
See application file for complete search history.

(56) References Cited

U.S. PATENT DOCUMENTS

| | | | | |
|---|---|---|---|---|
| 9,845,226 | B2* | 12/2017 | Baker | .................. B66B 19/002 |
| 2009/0065310 | A1* | 3/2009 | Flynn | .................. B66B 19/002 |
| | | | | 187/408 |
| 2016/0068369 | A1* | 3/2016 | Valkama | ............... B66B 5/0087 |
| | | | | 33/645 |
| 2016/0311657 | A1* | 10/2016 | Kilpelainen | ............ B66B 19/00 |
| 2016/0325968 | A1* | 11/2016 | Baker | .................. B66B 19/002 |
| 2018/0002141 | A1* | 1/2018 | Virta | ........................ B66B 7/02 |

FOREIGN PATENT DOCUMENTS

| JP | H08-67453 A | 3/1996 |
|---|---|---|
| JP | H09-240956 A | 9/1997 |
| WO | WO-2006/054982 A2 | 5/2006 |

OTHER PUBLICATIONS

International Search Report PCT/ISA/210 for International Application No. PCT/FI2014/050141 dated May 30, 2014.
Written Opinion of the International Searching Authority PCT/ISA/237 for International Application No. PCT/FI2014/050141 dated May 30, 2014.

* cited by examiner

METHOD IN THE INSTALLATION OF AN ELEVATOR AND TOOL FOR USE IN THE METHOD

This application is a continuation of PCT International Application No. PCT/FI2014/050141 which has an International filing date of Feb. 26, 2014, and which claims priority to Finnish patent application number 20135631 filed Jun. 7, 2013, the entire contents of both of which are incorporated herein by reference.

The object of the invention is methods relating to installation work in an elevator. Likewise, the object of the invention is tools for use in the installation of different parts of an elevator.

Although the solution according to the invention relates to a method for determining the position of the compensating weight guide rails of an elevator, in addition to the definition of the position of other elevator components and actuators to be installed in the hoistway, and in the description hereinafter the object of the inventive concept is referred to as inter alia the guide rails of compensating weights, the solution according to the invention can just as well be applied also to determining the position of the counterweight guide rails of an elevator, which determination can be considered as also belonging to the inventive content of the solution.

Known in the art are various solutions for determining the disposal location of elevator components and actuators to be installed in the hoistway, such as the guide rails of the elevator car, the guide rails of the compensating weights/counterweights, the sills of the doors of a landing, i.e. of hoistway doors, the top tracks of hoistway doors, et cetera, in which solutions inter alia plumb lines, laser measuring means, tape measures, et cetera, are used as an aid. The guide rails of the elevator car and of the compensating weights are fixed with their own guide rail brackets e.g. to the wall of the elevator hoistway in a precisely measured position with respect to the elevator hoistway and to the other structures of the elevator. In order for the guide rails to be reliably disposed in the correct position, each guide rail must be separately and precisely plumbed into position. This plumbing, and associated measurements, takes a lot of time and also it is possible that errors occur in the plumbing, which errors can cause damage in the structures of the elevator, noise problems or other problems, or at least extra work for afterwards rectifying the position of the guide rails. In addition, the other structures of the elevator must be situated extremely precisely with respect to the guide rails so e.g. the measurements to be made manually and with tape measures and the determinations of positions are slow and also give rise to many errors.

The aim of the present invention is to eliminate the aforementioned drawbacks and to achieve an inexpensive and easy-to-implement method in the installation of an elevator for determining the precise disposal location of the guide rails and other hoistway components quickly, safely and reliably. Another aim is to achieve a tool for implementing the aforementioned installation method. The preferred method according to the invention is moving the elevator car along a plurality of guide rails in an elevator hoistway such that the elevator car moves between different heights in the elevator hoistway; coupling a disposal location measuring device to each of the guide rails such that the measuring device is fixed to the guide rails and the measuring device defines a position in the hoistway, the measuring device including a dimension transfer member configured to define a position relative to the coupled guide rails; and determining a first disposal location, at different heights along the guide rails in the elevator hoistway, of at least one of one or more hoistway components to be disposed in the elevator hoistway, as the position defined by the dimension transfer member, relative to the guide rails, at each of the different heights along the guide rails. The preferred tool according to the invention is a rod-shaped frame member the frame member including detent members at opposite ends, the detent members being configured to couple with separate, respective guide rails in an elevator hoistway such that each detent member contacts a separate guide rail; and at least one dimension transfer member coupled to the frame member, the dimension transfer member being configured to define a position relative to the detent members; wherein the measuring device is configured to define a disposal location of the landing doors in relation to the guide rails based on the detent members coupling with the guide rails, such that the measuring device is fixed to the guide rails and the dimension transfer member defines the disposal location as a position in relation to the guide rails. Other embodiments of the invention are characterized by what is disclosed in the other claims.

Some inventive embodiments are also discussed in the descriptive section of the present application. The inventive content of the application can also be defined differently than in the claims presented below. The inventive content may also consist of several separate inventions, especially if the invention is considered in the light of expressions or implicit sub-tasks or from the point of view of advantages or categories of advantages achieved. In this case, some of the attributes contained in the claims below may be superfluous from the point of view of separate inventive concepts. Likewise the different details presented in connection with each embodiment of the invention can also be applied in other embodiments. In addition it can be stated that at least some of the subordinate claims can in at least suitable situations be deemed to be inventive in their own right.

One advantage, among others, of the solution according to the invention is that by means of it a fast, easy and reliable definition of the precise disposal location of hoistway components and/or of a landing door is enabled. Another advantage is that with the same tool most, or even all, the disposal locations of hoistway components and/or of a landing door can be determined. Another advantage is also that by copying the desired dimensions mechanically, the exact disposal locations are obtained repeatedly on the different floors very precisely and without measuring errors. Owing to the speed and ease of installation enabled by the solution according to the invention, another advantage is the cost saving achieved by the installation.

In the invention the interpositioning of some components in relation to each other is preferably maintained as the same by using as an aid a mechanical template arrangement or corresponding. In essence, the car guide rails coming into the elevator hoistway are plumbed into their position, and the positioned car guide rails are used after that as a lateral position reference for other components to be installed according to the invention when installing them, in which case when installing the other components their lateral position is copied using the tool, e.g. a template. There can be a temporary fixing on the tool for components, in which case the actual fixing of a component into position, e.g. onto the wall of the hoistway, can occur when the component is supported on the tool.

Preferably in the invention an elevator car placed on its guide rails is used as a working platform. The disposal location of the elevator hoistway components on the elevator car traveling along guide rails is determined in relation to the guide rails of the elevator car by copying the disposal location at different heights in the elevator hoistway mechanically by means of a tool. The designed disposal locations of the hoistway components are kept constant in relation to the guide rails of the elevator car during the whole period of determination of the disposal locations of the hoistway components, preferably also when fixing them into their positions. In other words, with the tool the lateral distances of certain selected components to be installed on the elevator are kept fixed.

When applying the invention in the installation of the landing doors of the elevator, the desired position of the either the door itself or a part of it, preferably the door frame, is determined or otherwise the position of the fixing means supporting the door is determined. This type of fixing means can be e.g. a bearer part to be fixed with a bolt fastening or otherwise to the wall or door opening of the elevator hoistway.

Figure 2:
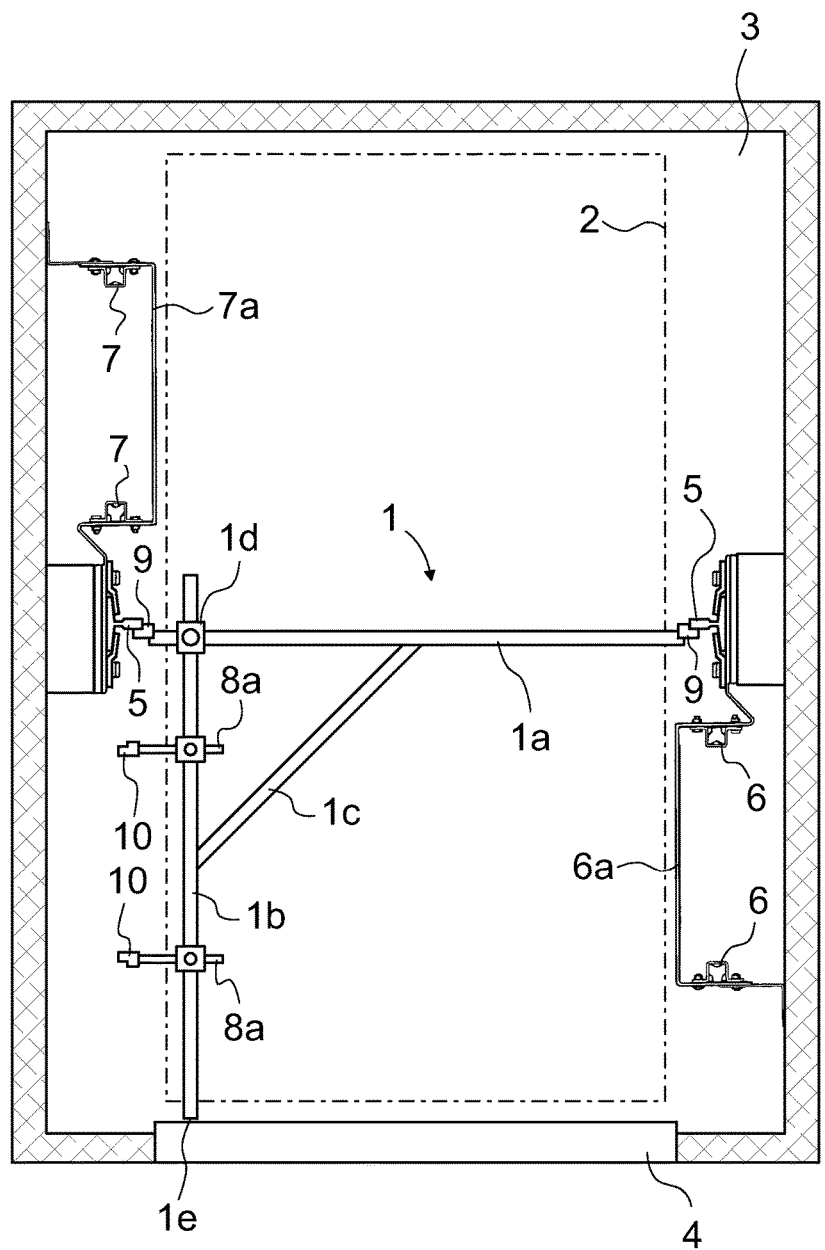
Figure 3:
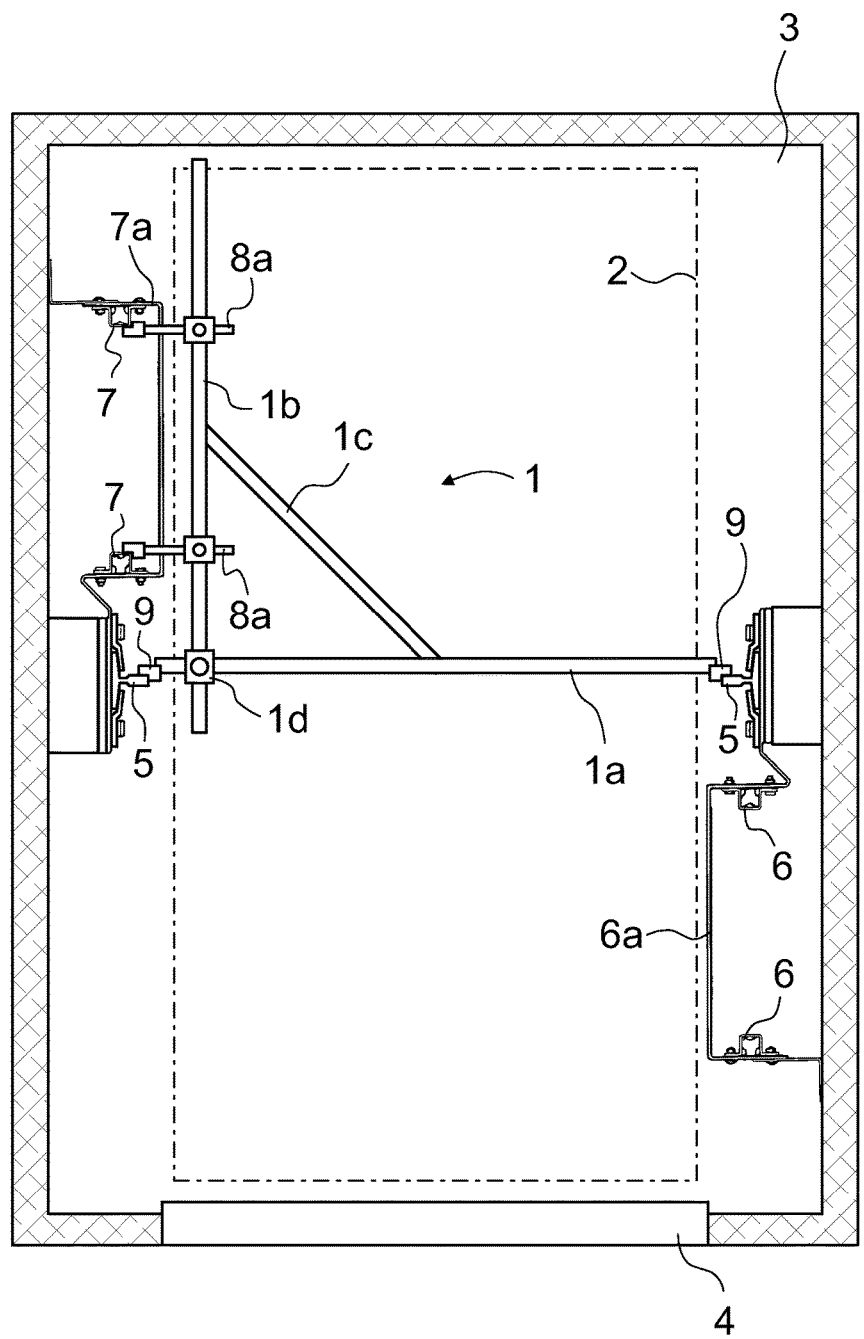
Figure 4:
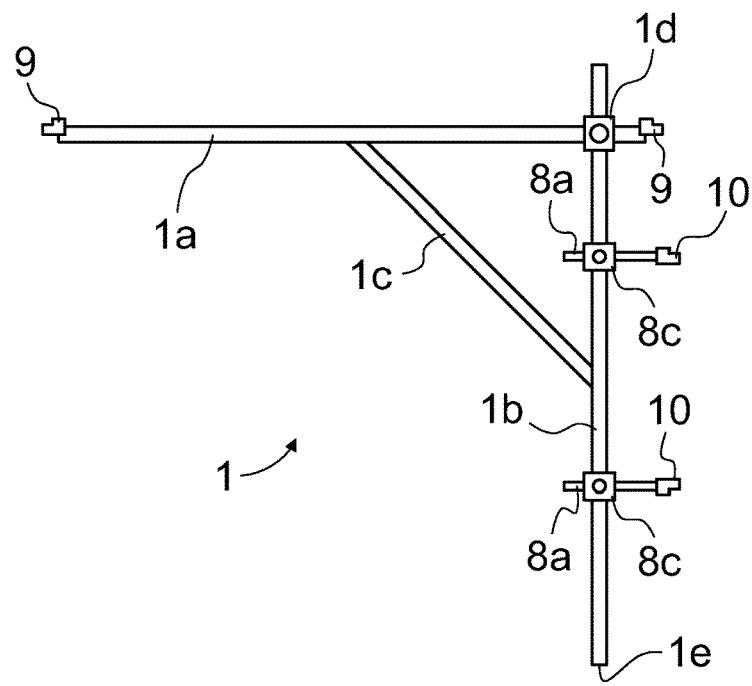
Figure 5:
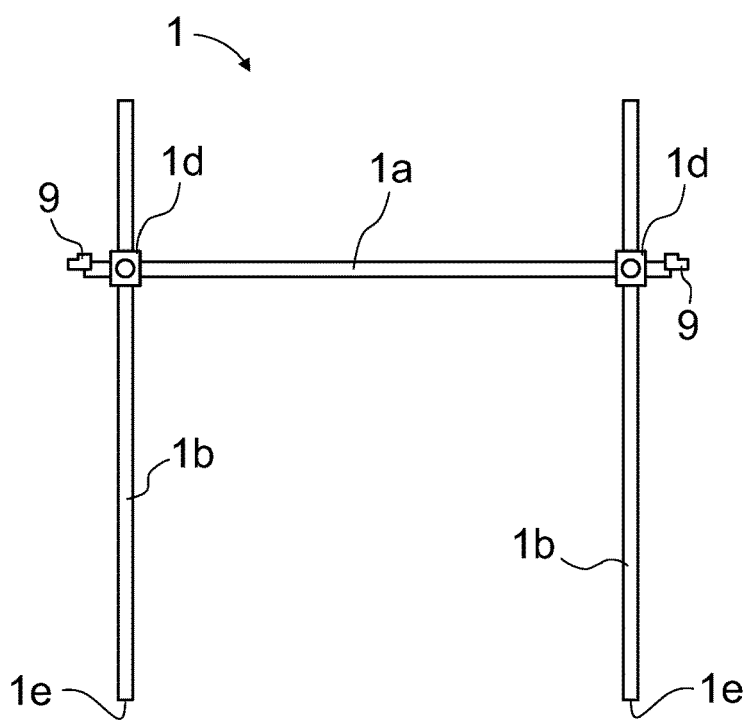
Figure 5A:
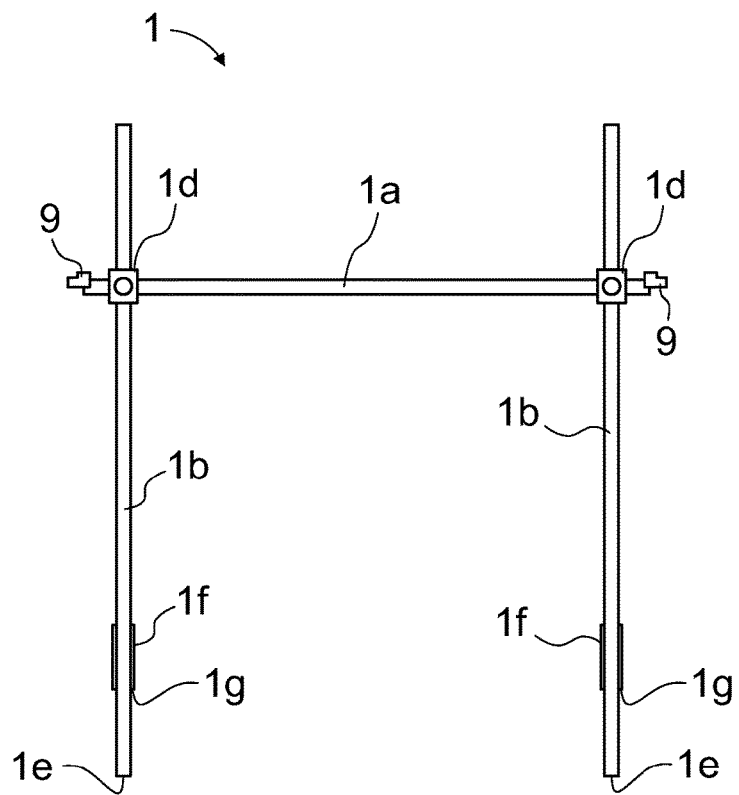
Figure 5B:
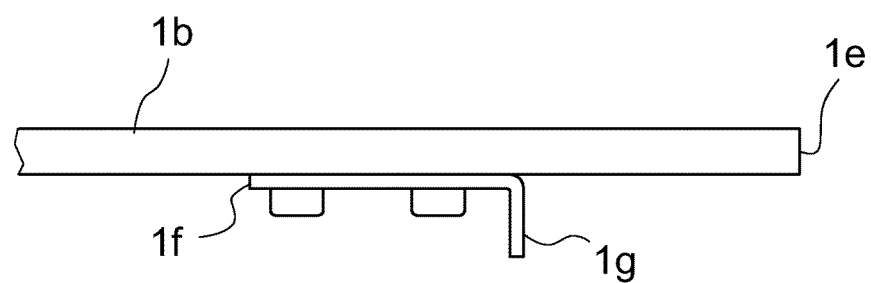
Figure 6:
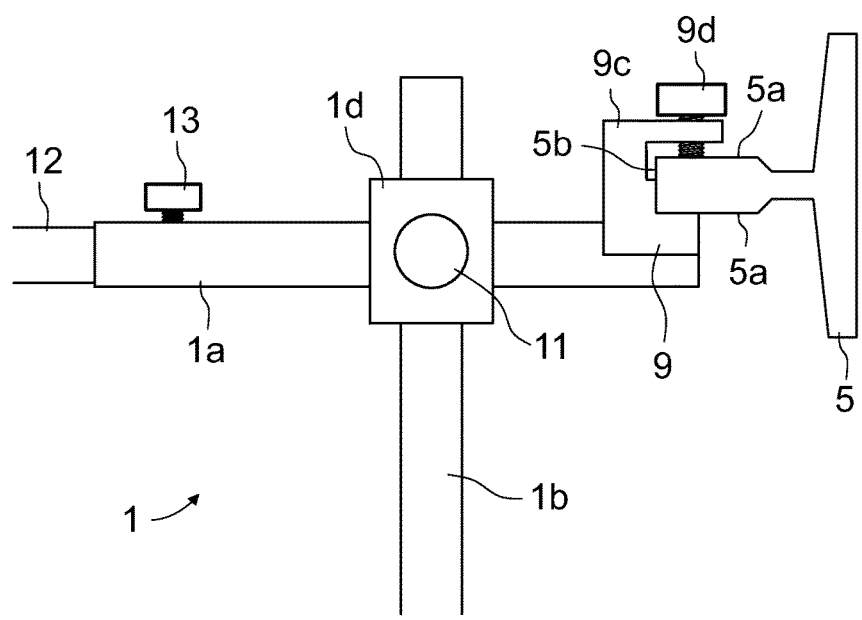
Figure 7:
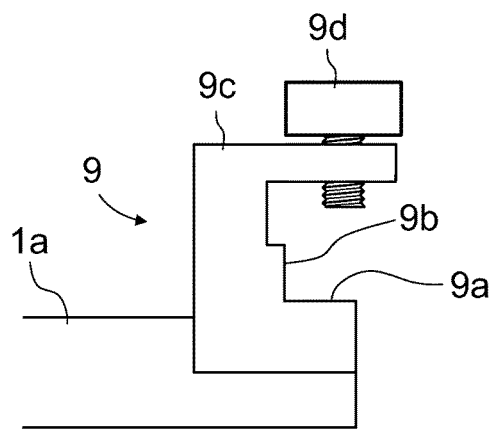
Figure 8:
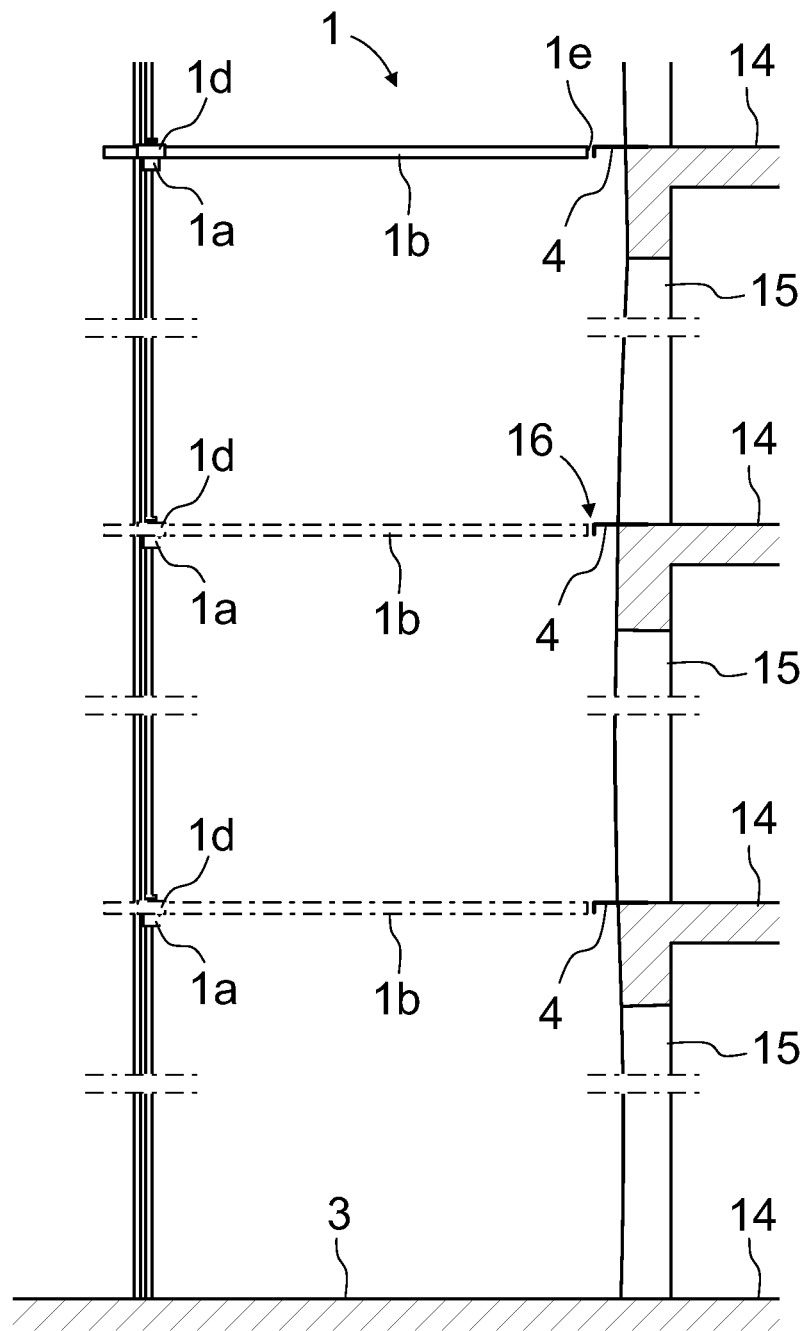

In the following, the invention will be described in more detail by the aid of some examples of its embodiment with reference to the simplified and diagrammatic drawings attached, wherein FIG. 1 presents a simplified and diagrammatic top view of one tool used in the method according to the invention in its first attitude in the elevator hoistway in connection with the determination of the disposal location of the hoistway components FIG. 2 presents a simplified and diagrammatic top view of one tool used in the method according to the invention in its second attitude in the elevator hoistway in connection with the determination of the disposal location of the hoistway components, FIG. 3 presents a simplified and diagrammatic top view of one tool used in the method according to the invention in its third attitude in the elevator hoistway in connection with the determination of the disposal location of the hoistway components, FIG. 4 presents a top view of one tool to be used in the method according to the invention, FIG. 5 presents a top view of a second tool to be used in the method according to the invention, FIG. 5a presents a top view of a third tool to be used in the method according to the invention, FIG. 5b presents a magnified side view of the first end, with its parts, of the dimension transfer means of the tool according to FIG. 5a, FIG. 6 presents a magnified top view of a part of one end of one tool to be used in the method according to the invention, said end being connected to the guide rail of an elevator car, FIG. 7 presents a top and further magnified view of the detent means and fixing part on one end of one tool to be used in the method according to the invention, and FIG. 8 presents a simplified and diagrammatic side view of the use in the elevator hoistway of a tool according to the invention.

FIG. 1 presents a tool 1 according to the invention fitted between the guide rails 5 of the elevator car 2 in the elevator hoistway 3 in such a way that the detent means 9 on the ends of the elongated and rod-shaped, and essentially rigid, frame part 1a rest on at least two guide surfaces of the guide part of the guide rails 5, namely on the front surface 5b of the guide rail 5 and on one side surface 5a of the guide rail 5. The front surface 5b and the side surfaces 5a of the guide rails 5 are seen more clearly in FIG. 6. The dimensions of the frame part 1a of the tool 1 and the dimensions of detent means 9 are configured to be such that the distance from each other of the detent surfaces 9b of the detent means 9, said detent surfaces resting on the front surface 5b of the guide rail 5, is essentially the same as the distance between the front surfaces 5b of the guide rails 5, i.e. the gauge, when the guide rails 5 are in their correct disposal locations according to plan.

When the tool 1 is fitted thus between the guide rails 5 of the elevator car 2 and the lowermost guide rails 5 of the elevator hoistway 3 are precisely installed into their correct disposal locations, the positions in the elevator hoistway 3 of the other hoistway components can be mechanically determined using the disposal location of the guide rails 5 of the elevator car 2 as a reference. For this function, a dimension transfer means 1b, which is e.g. an essentially rigid rod-shaped means with a length direction at essentially a right angle with respect to the longitudinal direction of the frame part 1a, is fixed to the frame part 1a of the tool 1.

The dimension transfer means 1b is fixed to the frame part 1a via a fixing means 1d, which fixing means 1d enables moving of the dimension transfer means 1b in relation to the frame part 1a in its longitudinal direction. In this way distance of the first end 1e, i.e. the measuring probe, of the dimension transfer means 1b from the frame part 1a and from the center line between the guide rails 5 of the elevator car 2 can be changed. For stiffening the tool 1, the dimension transfer means 1b is preferably supported on the frame part 1a with a diagonal strut 1c.

In the elevator hoistway 3 according to FIG. 1 there are guide rails 6 of the compensating weights or counterweights in addition to the guide rails 5 of the elevator car 2. In FIG. 1 the compensating weights are disposed on opposite sides of the elevator car 2 and on different sides of the guide rail line between the guide rails 5 of the elevator car 2 to each other, in which case the suspension of the elevator car 2 and of the compensating weights is very symmetrical and does not produce any additional stresses e.g. on the guide rails 5 of the elevator car. The guide rails 6 and 7 of the compensating weights are fixed into their positions by means of the guide rail brackets 6a and 7a, which guide rail brackets 6a, 7a are shaped in such a way that the two guide rails 6 opposite each other are fixed to the same guide rail brackets 6a and correspondingly the two guide rails 7 opposite each other are fixed to the same guide rail brackets 7a.

In the solution according to FIG. 1, fixed to the dimension transfer means 1b of the tool 1 according to the invention are two additional dimension transfer means 8a, which are fixed to those points on the dimension transfer means 1b that correspond to the distance of the guide rails 6 of the first compensating weight from the guide rail line between the guide rails 5 of the elevator car 2 in such a way that the detent surfaces of the detent means 10 on the free ends of the additional dimension transfer means 8a are disposed at a point according to plan of the guide surfaces of the guide rails 6 of the first compensating weight, i.e. at the point of at least one side surface and the front surface, said detent means 10 essentially corresponding to the detent means 9.

In the solution according to FIG. 1 the length of the dimension transfer means 1b of the tool 1 according to the invention is additionally adjusted to be such that the distance of the measuring probe 1e of the dimension transfer means 1b from the guide rail line between the guide rails 5 of the elevator car 2 corresponds to the distance according to plan of the edge of the sill 4 of the door of a landing, said edge being on the side of the elevator hoistway 3, or the distance according to plan of the fixing point of the sill 4, from the guide rail line between the guide rails 5 of the elevator car 2. In this way the position of the first end of the sill 4 of the door of the landing can be quickly and easily measured with the tool 1 according to the invention.

In the situation according to FIG. 1, therefore, the position of the guide rails 6 of the compensating weight and the position of the sill 4 of the door of a landing are measured with respect to the guide rail line between the guide rails 5 of the elevator car 2 when the tool 1 is in its position, in its first attitude, between the guide rails 5. Correspondingly, in the situation according to FIG. 2, the adjustments of the tool 1, i.e. the set disposal locations of the hoistway components, have not been changed, but the tool 1 has been turned 180° on the plane of the guide rail line and the detent means 9 are supported on the guide rails 5 from the same side of the guide rails 5 as in the first attitude of the tool 1. In this case the distance of the measuring probe 1e of the dimension transfer means 1b from the guide rail line between the guide rails 5 of the elevator car 2 again corresponds to the distance according to plan of the edge of the sill 4 of the door of a landing, said edge being on the side of the elevator hoistway 3, or the distance according to plan of the fixing point of the sill 4 from the guide rail line between the guide rails 5 of the elevator car 2, and the position of the second end of the sill 4 is easy to determine.

The situation according to FIG. 3 corresponds to the situation of FIG. 2, but the tool 1 has additionally been rotated 180° from its second attitude, on a plane perpendicular to the guide rail line, and displaced in such a way that the detent means 9 on the ends of the frame part 1a, the measuring probe 1e of the dimension transfer means 1b and the additional dimension transfer means 8a are now in their third attitude, which with respect to the first attitude of the tool 1 is on the opposite side of the guide rail line and the detent surfaces of the detent means 10 of the additional dimension transfer means 8a are disposed at the point according to plan of the guide surfaces of the guide rails 7 of the second compensating weight, i.e. at the point of at least one side surface and the front surface.

Thus, the positions of the two guide rails 6 and 7 of a compensating weight, as well as the positions of the sill 4 of the door of a landing, with respect to the guide rails 5 of the elevator car 2 are determined in the three different attitudes of the tool 1 without changing the adjustments of the tool 1, i.e. the disposal location settings. The disposal locations of the other hoistway components can be determined on the same principle.

FIG. 4 presents in more detail one tool 1 to be used in the method according to the invention. In this structural solution one dimension transfer means 1b is fixed to the frame part 1a of the tool 1, which dimension transfer means has a further two additional dimension transfer means 8a. The number of dimension transfer means 1b and of additional dimension transfer means 8a is not limited. There can be, depending on the need and on the application, either 1, 2 or also a number of units. In addition, their fixing to their mounting base can vary. The fixing means 1d of the dimension transfer means 1b can be implemented in such a way that the fixing means 1d is fixed into its position on the frame part 1a and only the distance of the measuring probe 1e of the dimension transfer means 1b from the frame part 1a can be changed by sliding the frame of the dimension transfer means 1b in its longitudinal direction in the fixing means 1e and by locking the frame of the dimension transfer means 1b into its position when the distance of the measuring probe 1e is that desired. The fixing means 1d can also be implemented in such a way that the fixing means 1d is fixed to the frame part 1a in a manner allowing movement in the longitudinal direction of the frame part 1a and correspondingly the dimension transfer means 1b is rigidly fixed to the fixing means 1d.

Yet a third solution is that the fixing means 1d can be movable in the longitudinal direction of the frame part 1a and the dimension transfer means 1b is fixed, in a manner allowing movement in its longitudinal direction, to the fixing means 1d. In this case the position of the measuring probe 1e of the dimension transfer means 1b can be adjusted in both the longitudinal direction of the frame part 1a of the tool 1 and in an orthogonal direction to the frame part 1a.

Likewise additional dimension transfer means 8a can be fixed to the frame of the dimension transfer means 1b in many different ways. Each additional dimension transfer means 8a is e.g. fixed to the frame of the dimension transfer means 1b via a fixing means 8c, which fixing means 8c enables the moving of the additional dimension transfer means 8a in its longitudinal direction in relation to the frame of the dimension transfer means 1b. Thus the distance of the detent means 10 on the first end of the additional dimension transfer means 8a in relation to the frame of the dimension transfer means 1b can be adjusted. It is also possible to implement the fixing of the additional dimension transfer means 8a to the frame of the dimension transfer means 1b in such a way that the fixing means 8c enables displacement of the additional dimension transfer means 8a also in the longitudinal direction of the frame of the dimension transfer means 1b.

Yet another possibility is one in which displacement of the additional dimension transfer means 8a is possible only in the longitudinal direction of the frame of the dimension transfer means 1b. In this case the distance of the detent means 10 with respect to the frame of the dimension transfer means 1b cannot be changed, but the correct position of the detent means 10 is now found by displacing the whole dimension transfer means 1b in the longitudinal direction of the frame part 1a of the tool 1 into a position which determines the correct disposal location of the detent means 10.

FIG. 5 presents a top view of a second tool 1 to be used in the method according to the invention. The tool 1 is similar to the tool according to FIG. 4, but now instead of one dimension transfer means 1b it has two essentially similar dimension transfer means 1b that are disposed on the frame part 1a symmetrically close to each end of the frame part 1a. This solution speeds up, inter alia, determination of the position of the sill 4 of the door of a landing because now the position of both ends of the sill 4 can now be determined with the same attitude of the tool 1.

Although it is not presented in FIG. 5, in this solution also additional dimension transfer means for determining the position of the guide rails of a compensating weight can be fixed to the dimension transfer means 1b, and likewise short diagonal struts corresponding to the diagonal strut 1c are possible, because the dimension transfer means 1b does not need to be displaced long distances along the frame part 1a.

FIGS. 5a and 5b present a third tool 1 to be used in the method according to the invention. In FIG. 5a the tool 1 is presented as viewed from above and FIG. 5b presents the first end, plus its parts, of the dimension transfer means 1b of the tool 1 as a magnified view from the side. The tool 1 presented in FIGS. 5a and 5b is suited particularly well to mechanically determining the position of the sill of the landing doors of the elevator and the position of the landing doors. The tool 1 according to FIG. 5a is otherwise similar to the tool 1 presented in FIG. 5, but on both dimension transfer means 1b now, near the first end 1e of them, is an additional dimension transfer means 1f, which has on the vertical plane a measuring surface 1g, by means of which the position of the sill 4 of the door of a landing can be determined. The measuring surface 1g is therefore at an equal distance from the guide rail line between the guide rails 5 of the elevator car 2 as the position according to plan of the sill 4 of the door of the landing.

In addition, the length of the dimension transfer means 1b of the tool 1 is adjusted to be such that the distance of the measuring probe 1e of the dimension transfer means 1b from the guide rail line between the guide rails 5 of the elevator car 2 corresponds to the distance according to plan of the edge of a landing door, or part thereof, or preferably of the edge of a door frame, said edge being on the elevator hoistway 3 side, from the guide rail line between the guide rails 5 of the elevator car 2, and the distance between the side edges of the door of the landing corresponds to the distance of the dimension transfer means 1b from each other. In this way it is easy and quick to determine the positions of the doors of a landing mechanically with the tool 1 according to the invention.

FIG. 6 presents a magnified top view of a part of one end of one tool 1 to be used in the method according to the invention when fixed to the guide rail 5 of the elevator car 2 in such a way that the first detent surface 9a of the detent means 9 rests on one side surface 5a of the guide part of a guide rail 5 of the elevator car and the second detent surface 9b rests on the front surface 5b of the guide part of the guide rail 5.

The structure of the tool 1 according to FIG. 6 differs from the structures presented earlier inter alia in that the detent means 9 has a fixing part 9c, which comprises a tightening means 9d, such as a tightening screw, by means of which the detent means 9, and at the same time the whole tool 1, is pressed against a guide rail 5 of the elevator during the determination of the position of the hoistway components. In addition, the frame part 1a of the tool 1 according to FIG. 6 is telescopic in such a way that inside the frame part 1a is a telescopic extension part 12, which enables adjustment of the length of the frame part 1a. The frame part 1a is locked to the desired length by the aid of a locking means 13, such as a locking screw.

The fixing means 1d of the dimension transfer means 1b enables movement in its longitudinal direction of the dimension transfer means 1b in relation to the frame part 1a. The dimension transfer means is locked into its correct position by the aid of a locking means 11, such as a locking screw. The fixing of the dimension transfer means 1b to the frame part 1a is not shown in more detail in FIG. 6. The fixing of the dimension transfer means 1b to the frame part 1a can be rigid or the fixing of the dimension transfer means 1b to the frame part 1a can be made to be such that the dimension transfer means 1b can be moved in the longitudinal direction of the frame part 1a.

FIG. 7 presents a top view, further magnified for illustration purposes, of the detent means 9 and fixing part 9c, with its tightening means 9d, on one end of the tool 1 according to FIG. 6. Since the tool 1 is not now fixed to a guide rail 5, the first detent surface 9a and second detent surface 9b of the detent means are clearly visible in the figure.

FIG. 8 presents a simplified and diagrammatic side view of the use in the elevator hoistway 3 of a tool 1 according to the invention. The deviation from straightness of the surface of the front wall of the elevator hoistway, i.e. the door wall on the hoistway side, is deliberately exaggerated. In addition, the tool 1 according to the invention is presented with an unbroken line on the topmost floor level 14 visible in FIG. 8 and with a dot-and-dash line on the floor levels 14 below it. The elevator hoistway 3 and its structures are simplified and each floor is truncated at the point of the door opening 15 of the landing. Of the components of the elevator hoistway, only one guide rail 5 of the elevator car and the sills 4 of the doors of a landing are presented in the elevator hoistway.

With the method according to the invention determination of the position of components of the elevator hoistway 3 occurs with the tool 1 according to the invention e.g. as follows: Initially, using methods known in the art, the positions of the guide rails 5 of the elevator car 2 are determined and the lowermost guide rails 5 are fixed into their position in the elevator hoistway 3. If necessary, the positions also of other hoistway components are determined in the bottom part of the base of the elevator hoistway 3. The tool 1 according to the invention can already be used for this determination, which tool is adjusted to the dimensions according to plan in such a way that e.g. the position of the sill 4 of the door of a landing and the positions of the guide rails 6, 7 of the compensating weights can be determined in relation to the guide rails 5 of the elevator car 2.

When moving higher up, the elevator car 2 is installed into its position and it is lifted by means of an auxiliary machine along the guide rails 5 higher as the installation progresses. The tool 1 according to the invention is used after installation of the elevator car 2 on the roof of the elevator car 2 by situating the elevator car 2 in a position in the height direction from which e.g. the position of the sill 4 of the door of the next landing 14 can easily be determined, by situating the tool 1 between the guide rails 5, and by pointing the measuring probe 1e of the dimension transfer means 1b towards the door opening 15 of the landing 14 at the point of the floor of the landing 14. If necessary, the distance of the measuring probe 1e is configured to be such that a small, predefined gap 16 remains between the sill 4 and the measuring probe 1e.

It is advantageous to fix the tool 1 to the guide rails 5 at the desired height temporarily, in which case determination of the position of the hoistway components, such as of the sill 4 and top tracks of the door of a landing as well as of the guide rails 6, 7 of the compensating weights, is easy by copying the set position according to plan of a hoistway component mechanically at each desired height position.

As the installation progresses, the elevator car 2 is lifted always higher to the next measuring location and the tool 1 with its preset adjustments is fixed, for the duration of the position determination, between the guide rails 5 and the determination of the disposal location of the desired hoistway components is performed mechanically. If necessary, the tool 1 is turned 180° on the plane of the guide rail line without changing the adjustments and is also rotated 180° on a plane orthogonal to the guide rail line and is also displaced in such a way that the detent means 9 on the ends of the frame part 1a, the measuring probe 1e of the dimension transfer means 1b and the additional dimension transfer means 8a are displaced to the opposite side of the guide rail line with respect to the first attitude.

It should also be noted that the different solutions and features presented above can be inventive features together with one or more other features of the invention.

It is obvious to the person skilled in the art that the invention is not limited solely to the examples described above, but that it may be varied within the scope of the claims presented below. Thus, for example, the tool according to the invention can be structurally different to what is presented above and likewise the phases of the method according to the invention can be different and in a different sequence to what is presented above.

The invention claimed is:

1. A method for installing an elevator, said elevator including an elevator car, the method comprising:
moving the elevator car along a plurality of guide rails in an elevator hoistway such that the elevator car moves between different heights in the elevator hoistway;
coupling a disposal location measuring device to each of the guide rails such that the measuring device is fixed to the guide rails and the measuring device defines a position in the hoistway, the measuring device including a dimension transfer member configured to define a position relative to the coupled guide rails; and
determining a first disposal location, at different heights along the guide rails in the elevator hoistway, of at least one of one or more hoistway components to be disposed in the elevator hoistway, as the position defined by the dimension transfer member, relative to the guide rails, at each of the different heights along the guide rails.

2. The method according to claim 1, wherein the disposal location measuring device includes,
a frame member, the frame member including frame detent members at opposite ends,
wherein the dimension transfer member is coupled to the frame member such that the dimension transfer member is configured to define the position relative to the frame detent members; and
the coupling the disposal location measuring device to each of the guide rails includes coupling the frame detent members to separate, respective guide rails such that the dimension transfer member defines the position relative to the coupled guide rails.

3. The method according to claim 2, further comprising:
rotating the disposal location measuring device around a lateral axis of the frame member such that,
the frame detent members are swapped between being coupled to opposite guide rails, and
the dimension transfer member remains on a common side of a guide rail plane through which each of the guide rails extend; and
determining a second disposal location as a position, defined by the dimension transfer member relative to the guide rails, that is proximate to an opposite side of the hoistway relative to the first disposal location.

4. The method according to claim 2, further comprising:
rotating the disposal location measuring device around a longitudinal axis of the frame member such that,
the frame detent members remain coupled to the separate, respective guide rails, and
the dimension transfer member between sides of a plane through which the guide rails extend; and
determining a second disposal location as a position, defined by the dimension transfer member relative to the guide rails, that is proximate to an opposite side of the hoistway relative to the first disposal location.

5. The method according to claim 2, wherein determining the first disposal location, at different heights along the guide rails in the elevator hoistway, includes,
at each given height, reversibly coupling the frame detent members to separate, respective guide rails and determining the position defined by the dimension transfer member, relative to the guide rails at the given height, as the first disposal location at the given height.

6. The method according to claim 2, wherein,
the dimension transfer member includes at least one dimension transfer detent member, the dimension transfer detent member including one or more detent surfaces configured to define a position, relative to the frame detent members, of a guide surface of the at least one of the one or more hoistway components.

7. The method according to claim 6, wherein,
the dimension transfer member is a rigid rod-shaped member,
the dimension transfer member includes a measuring probe configured to define the position relative to the frame detent members, the measuring probe being configured to be adjustably positioned on the dimension transfer member to adjust the defined position, and
the one or more hoistway components includes at least one of,
a sill of a door of a landing, and
a hanger rail of the door of the landing.

8. The method according to claim 6, wherein,
the dimension transfer member includes a plurality of dimension transfer detent members coupled to the dimension transfer member, and
the plurality of dimension transfer detent members are configured to be movably coupled to the dimension transfer member along a longitudinal axis of the dimension transfer member.

9. The method according to claim 6, wherein,
the dimension transfer detent member includes at least one detent surface configured to define a position, relative to the frame detent members, of a guide surface of at least one of,
a guide rail of a compensating weight of the elevator, and
a guide rail of a counterweight of the elevator.

10. The method according to claim 2, wherein
each frame detent member includes a screw clamp member, each screw clamp member being configured to reversibly fix the measuring device to a separate one of the guide rails.

11. A method for installing one or more landing doors of an elevator, the elevator including an elevator car configured to move along guide rails in an elevator hoistway such that the elevator car moves between different heights in the elevator hoistway, the method comprising:
coupling a disposal location measuring device to each of the guide rails such that the measuring device is fixed to the guide rails and the measuring device defines a position in the hoistway, the measuring device including a dimension transfer member configured to define a position relative to the coupled guide rails; and
determining a first disposal location of at least one landing door in relation to the guide rails of the elevator car, such that the at least one landing door is fixed into the disposal location, as the position defined by the dimension transfer member, relative to the guide rails, at each of the different heights along the guide rails.

12. The method according to claim 11, wherein the disposal location measuring device includes,
a frame member, the frame member including frame detent members at opposite ends,
wherein the dimension transfer member is coupled to the frame member such that the dimension transfer member is configured to define the position relative to the frame detent members; and
the coupling the disposal location measuring device to each of the guide rails includes coupling the frame detent members to separate, respective guide rails such that the dimension transfer member defines the position relative to the guide rails.

13. The method according to claim 12, further comprising:
rotating the disposal location measuring device around a lateral axis of the frame member such that,
the frame detent members are swapped between being coupled to opposite guide rails, and
the dimension transfer member remains on a common side of a guide rail plane through which each of the guide rails extend; and
determining a second disposal location as a position, defined by the dimension transfer member relative to the guide rails, that is proximate to an opposite side of the hoistway relative to the first disposal location.

14. The method according to claim 12, further wherein determining the first disposal location, at different heights along the guide rails in the elevator hoistway, includes,
at each given height, coupling the frame detent members to separate, respective guide rails and determining the position defined by the dimension transfer member, relative to the guide rails at the given height, as the first disposal location at the given height.

15. A disposal location measuring device for installing one or more landing doors of an elevator, the elevator including an elevator car configured to move along guide rails in an elevator hoistway, the measuring device comprising:
a rod-shaped frame member, the frame member including detent members at opposite ends, the detent members being configured to couple with separate, respective guide rails in an elevator hoistway such that each detent member contacts a separate guide rail; and
at least one dimension transfer member coupled to the frame member, the dimension transfer member being configured to define a position relative to the detent members;
wherein the measuring device is configured to define a disposal location of the landing doors in relation to the guide rails based on the detent members coupling with the guide rails, such that the measuring device is fixed to the guide rails and the dimension transfer member defines the disposal location as a position in relation to the guide rails.

16. The measuring device according to claim 15, wherein, the dimension transfer member includes at least one dimension transfer detent member, the dimension transfer detent member including one or more detent surfaces configured to define a position, relative to the frame detent members, of a guide surface of the at least one of the one or more hoistway components.

17. The measuring device according to claim 16, wherein, the dimension transfer member is a rigid rod-shaped member,
the dimension transfer member includes a measuring probe configured to define the position relative to the frame detent members, the measuring probe being configured to be adjustably positioned on the dimension transfer member to adjust the defined position.

18. The measuring device according to claim 17, wherein, the dimension transfer member includes a plurality of dimension transfer detent members coupled to the dimension transfer member, and
the plurality of dimension transfer detent members are configured to be movably coupled to the dimension transfer member along a longitudinal axis of the dimension transfer member.

19. The measuring device according to claim 16, wherein, the dimension transfer detent member includes at least one detent surface configured to define a position, relative to the frame detent members, of a guide surface of at least one of,
a guide rail of a compensating weight of the elevator, and
a guide rail of a counterweight of the elevator.

20. The measuring device according to claim 15, wherein, each frame detent member includes a screw clamp member, each screw clamp member being configured to reversibly fix the measuring device to a separate one of the guide rails.

* * * * *